(12) United States Patent
Gupta et al.

(10) Patent No.: US 6,847,985 B1
(45) Date of Patent: *Jan. 25, 2005

(54) FLOATING POINT DIVIDE AND SQUARE ROOT PROCESSOR

(75) Inventors: Gagan V. Gupta, Union City, CA (US); Mengchen Yu, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 09/927,139

(22) Filed: Aug. 10, 2001

(51) Int. Cl.[7] .............................................. G06F 7/38
(52) U.S. Cl. ...................................... 708/500; 708/504
(58) Field of Search ............................... 708/500, 502, 708/504, 605, 650, 653, 654, 655, 656, 510

(56) References Cited

U.S. PATENT DOCUMENTS 5,404,324 A  *  4/1995  Colon-Bonet ............... 708/650
5,870,323 A  *  2/1999  Prabhu et al. ............... 708/650
6,108,682 A  *  8/2000  Matheny ..................... 708/656

* cited by examiner

*Primary Examiner*—Chuong Dinh Ngo
(74) *Attorney, Agent, or Firm*—Westman, Champlin & Kelly

(57) ABSTRACT

An iterative mantissa calculator calculates a quotient mantissa for a divide mode or a result mantissa for a square-root mode. The calculator includes at least first and second summing devices. In the divide mode, each summing device calculates a respective estimated partial remainder $W[j+1]$ for the next iteration, $j+1$, as $2*W[j]-S_{j+1}*D$, where $W[j]$ is the estimated partial remainder for the current iteration calculated during the prior iteration, $S_{j+1}$ is the quotient bit estimated for the next iteration, and D is the respective divisor bit. The estimated quotient bit for the next iteration is selected based on the calculated partial remainder. In the square-root mode, the first summing device calculates $2W[j]-2S[j]S_{j+1}$, where $W[j]$ is the estimated partial remainder and $S_{j+1}$ is the estimated result generated during the current iteration, j. A shift register shifts the value of the estimated result, $S_{j+1}$, to generate $-S_{j+1}^2 \cdot 2^{-(j+1)}$, which is summed with the result from the first summing device to generate the estimated partial remainder for the square root mode.

17 Claims, 2 Drawing Sheets

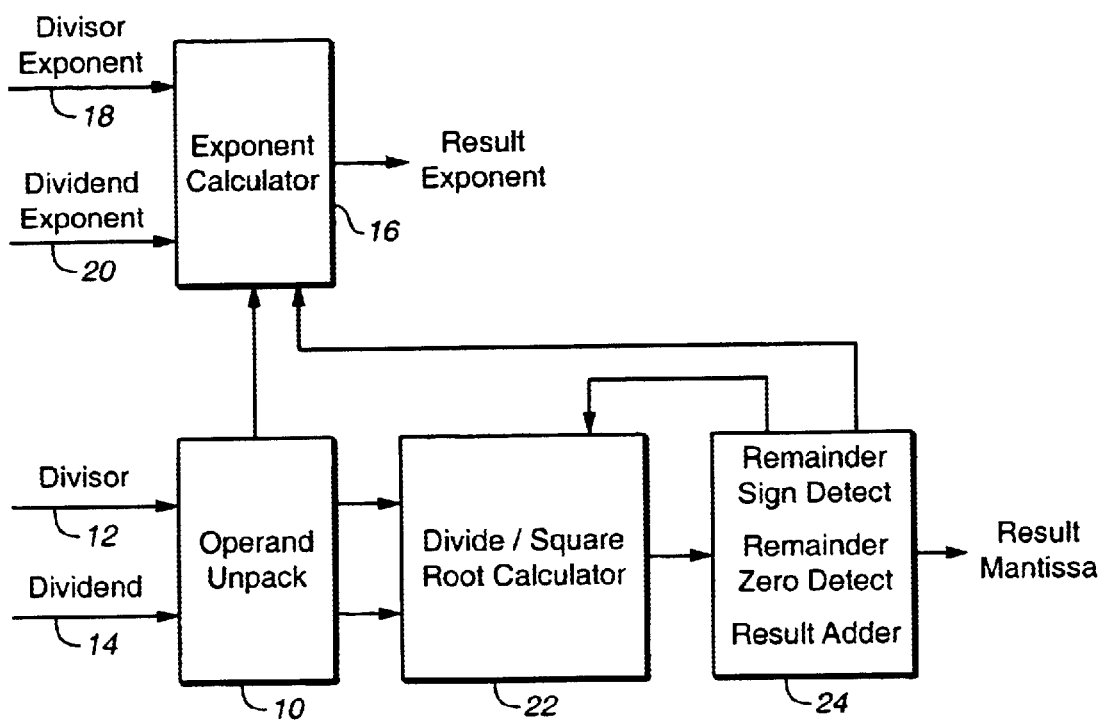
FIG._1

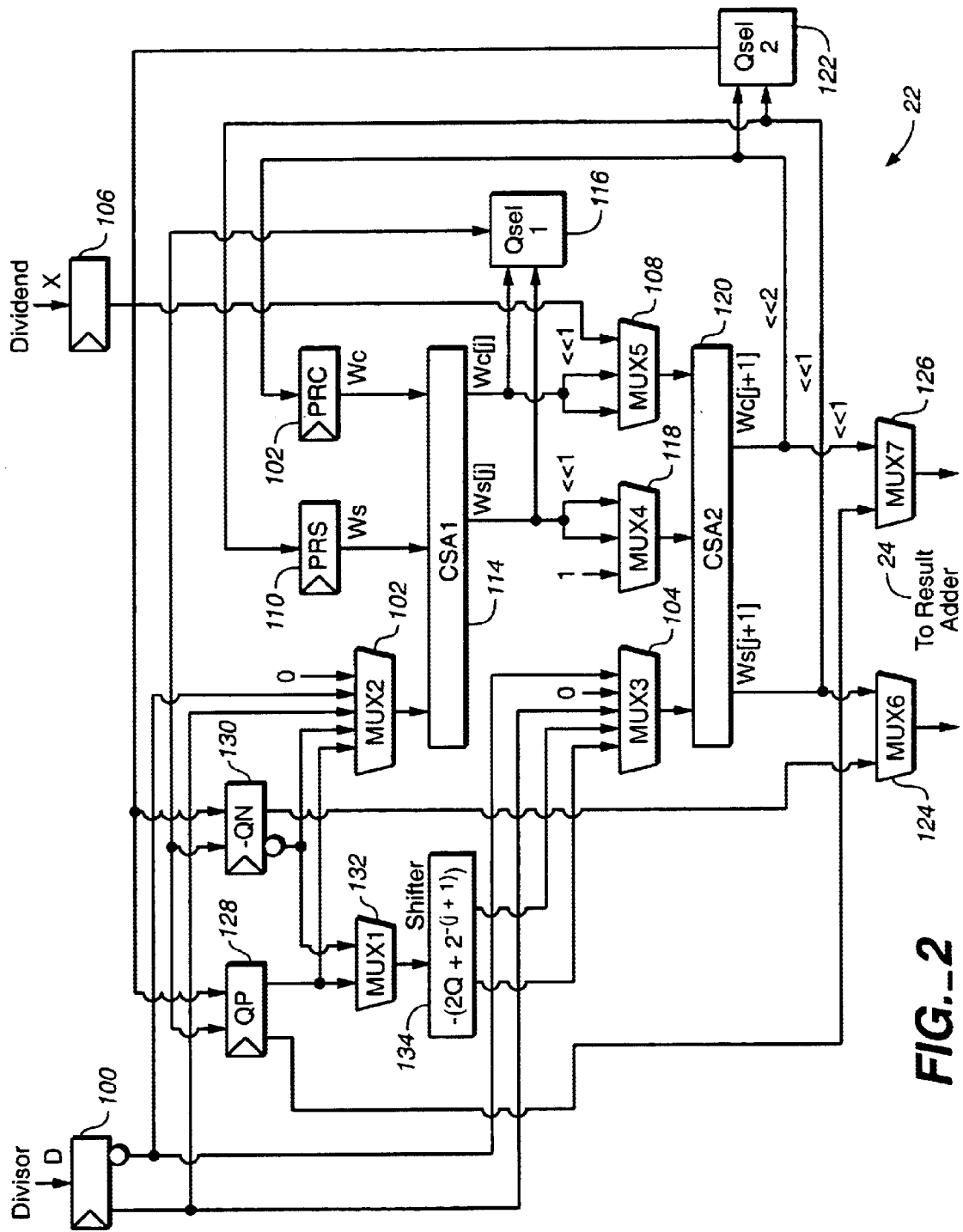
FIG._2

FLOATING POINT DIVIDE AND SQUARE ROOT PROCESSOR

FIELD OF THE INVENTION

This invention relates to floating point arithmetic units for a central processing unit (CPU), and particularly to a floating point divide and square root processor that requires minimal space in an integrated circuit (IC).

BACKGROUND OF THE INVENTION

Floating point divide and square root processors require a considerable physical region of an IC. To conserve space, divide and square root functions are usually implemented employing iterative algorithms so that the same hardware is utilized iteratively over multiple cycles to produce the final result. Depending on the particular design, each iteration of the algorithm produces either a single bit or multiple bits of the divide or square root result. Generally, processors that produce multiple bits each iteration can produce the final result in a shorter time period than processors that produce fewer or single bits each iteration. Also generally, the amount of hardware increases with the number of bits produced each iteration. Consequently, processors that produce multiple bits during each iteration require more IC space than processors that produce a single bit. Moreover, as the hardware increases, operation frequency is reduced. Hence, IC designers try to design divide and square root processors that strike a compromise between area and speed.

Most divide processors use a Radix-4 algorithm that produces up to two quotient bits during each iteration. However, the Radix-4 algorithm is complex, significantly more complex than a Radix-2 algorithm which produces one quotient bit each iteration. Moreover, the Radix-4 algorithm requires more hardware than the Radix-2 algorithm;

The algorithms that implement divide and square root functions are often similar. To conserve space on the IC, designers try to utilize as much of the divide hardware as possible in the implementation of the square root functions. However, these techniques have not been altogether successful. More recently, designers have implemented the divide function using the multiplier array of the arithmetic unit of the CPU, providing additional support for square root. However, the multiplier array also consumes a large amount of area on the IC, and can be frequency limited, so little is gained with this approach. Accordingly, there is a need for a divide and square root processor with improved spatial requirements.

SUMMARY OF THE INVENTION

In one embodiment, an iterative mantissa calculator calculates a quotient mantissa based on a divisor mantissa and a dividend mantissa or a square-root result mantissa based on an operand mantissa The calculator includes at least first and second summing devices and at least first and second selectors. In the divide mode, the summing devices are arranged to calculate respective partial remainders during respective iterations and the selectors are responsive to the partial remainders to select a bit for an accumulated quotient. In preferred embodiments of the divide mode, each summing device calculates a respective estimated partial remainder $W[j+1]$ for the next iteration, $j+1$, as $2*W[j]-S_{j+1}*D$, where $W[j]$ is the estimated partial remainder for the current iteration calculated during the prior iteration, $S_{j+1}$ is the selected quotient bit estimated, and $D$ is the respective divisor bit.

In the square-root mode, the first and second summing devices operate during a single iteration to generate a partial remainder $W[j+1]$ and the second selector selects a result bit $S_{j+1}$. During each iteration, $j$, the first summing device calculates $2W[j]-2S[j]S_{j+1}$, where $W[j]$ is the partial remainder that was estimated by the second summing device during the prior iteration, $S[j]$ is the accumulated result to the current iteration, and $S_{j+1}$ is the selected result bit. A shift register shifts the value of the accumulated result to generate $-S_{j+1}^2 \cdot 2^{-(j+1)}$. The second summing device adds the shifted result to the results of the first summing device to generate the partial remainder for the square root mode.

In preferred embodiments, result adder is responsive to the partial remainder and the accumulated result or quotient to provide the result or quotient mantissa.

BRIEF DESCRIPTION OF THE DRAWINGS

FIG. 1 is a functional block diagram of a floating point divide and square root processor according to one embodiment of the present invention.

FIG. 2 is a functional block diagram of divide/square root calculator used in the processor of FIG. 1.

DETAILED DESCRIPTION OF THE PREFERRED EMBODIMENTS

The present invention is directed to a divide and square root processor that meets a compromise between area and speed to implement the divide function. The square root function is implemented using the same hardware with minimal addition. Simple hardware, and hence low area and high speed, is achieved by using a SRT Radix-2 type algorithm.

FIG. 1 is a block diagram of the functional unit of a divide and square root processor according to one embodiment of the invention. The processor includes an operand unpack 10 that receives the divisor and dividend for a divide operation via busses 12 and 14, respectively. An exponent calculator 16 receives the divisor exponent and dividend exponent via busses 18 and 20, respectively. For a divide operation $$\left(\frac{\text{Dividend}}{\text{Divisor}}\right),$$

divisor bus 12 carries the divisor and dividend bus 14 carries the dividend. Divisor exponent bus 18 carries the exponent part of the divisor, and dividend exponent 20 carries the exponent part of the dividend. For a square root operation $\sqrt{\text{operand}}$), dividend bus 14 carries the operand, and dividend exponent bus 20 carries the exponent of the operand. Divisor bus 12 and divisor exponent bus 18 are not used for square root operations.

For a divide operation, the resultant exponent is calculated based on the inputs. The exponent is adjusted, as required, based on the final mantissa result. For a square root operation, computation of the resultant exponent is based solely a on the operand (dividend) exponent.

Divide/square root calculator 22 iteratively computes the mantissa results, 2 bits during each cycle for divide operations and 1 bit during each cycle for square root operations, and accumulates the result in a redundant number format.

Calculator 22 employs at least two carry-save adders, arranged in a cascaded manner In the divide mode, each carry-save adder generates a result bit during a respective iteration, so that during each cycle through the carry-save adders at least two result bits are accumulated in a partial remainder. In the square root mode, the cascaded carry-save adders generate one result bit during each cycle.

Each carry-save adder in calculator 22 accumulate a partial remainder based on an SRT Radix-2 algorithm. Upon completion of the process by calculator 22, the partial remainders accumulated through the last cycle are processed by result adder 24.

The SRT algorithm is similar to a traditional division algorithm, where the result is computed one digit at a time. At each step a partial remainder is calculated which is used in the next step. The recurrence equation for division is defined as:

$$W[j+1]=2*W[j]-S_{j+1}*D,$$

where W[j] is the partial remainder of jth iteration, D is the divisor, $S_{j+1}$ is the quotient bit for the (j+1)th iteration, and W[j+1] is the new partial remainder for the (j+1)th iteration. The SRT division algorithm generates a partial remainder W[j+1] on each iteration of the divide operation, subtracting a multiple of the divisor from the scaled current partial remainder W[j].

The SRT algorithm is implemented in redundant residual form. The carry-save adders compute the partial remainders, with each partial remainder being represented by two numbers, the sum (Ws) and the carry (Wc). The real value of the partial remainder is derived from the sum of Ws and Wc. The quotient estimate is obtained from the partial remainder.

The square root algorithm computes one result bit during each cycle. At each iteration a partial remainder is calculated which is used in the next iteration. The recurrence equation for square root is defined as:

$$W[j+1]=2*W[j]-2S[j]S_{j+1}-S_{j+1}^2 \cdot 2^{-(j+1)},$$

where W[j] is the partial remainder estimated for the j-th iteration, S[j] is the accumulated result to the j-th iteration, $S_{j+1}$ is the result bit for the (j+1)th iteration, and W[j+1] is the new partial remainder for the (j+1)th iteration. The square root algorithm generates a partial remainder W[j+1] on each iteration of the square root operation. Unlike the divide algorithm where two result bits are generated during the two iterations of each cycle, the square root algorithm generates a single result bit during each cycle.

At each iteration, the next result bits are computed based on the partial remainder of the prior iteration (W[j]). The result is accumulated in calculator 22. After all the requisite result bits have been computed, the accumulated partial remainder is sent to the remainder zero and sign detect portion of block 24. The accumulated result may be adjusted in block 24 based on the input from zero and sign detect functions.

The remainder zero/sign detect and result adder block 24 receives input in redundant format from the divide/square root calculator 22 and generates a final 2's compliment value. When calculator 22 outputs partial remainders, the remainder zero/sign detect portion of block 24 performs a zero detect and also checks for the sign bit of the remainder. When the calculator 22 supplies the final result in a redundant format, block 24 produces the final result in binary format.

FIG. 2 illustrates a more detailed embodiment of divide/square root calculator 22. Calculator 22 uses the SRT Radix-2 algorithm, using redundant quotient digits. While each iteration of the divide generates one bit of the quotient, the divider performs two iterations per cycle, and consequently produces two quotient bits per cycle. In the square root mode, the hardware performs one iteration per cycle, producing one result bit per cycle. The hardware required to perform one iteration is substantially duplicated to produce two quotient bits. Both the quotient and the remainder are kept redundantly within the divide unit and their components are combined subsequently to determine their value.

In the divide mode, divisor D is input through register 100 so that the divisor D and its complement are input to multiplexers 102 and 104. Dividend X is input through register 106 to multiplexer 108. Partial Remainder-Save (PRS) register 110 and Partial Remainder-Carry (PRC) register 112 store the sum (Ws) and carry (Wc) components of partial remainder (W[j−1]) that were calculated during the prior iteration (j−1). W[j−1] and the output of multiplexer 102 are input to adder 114, which provides the current iteration partial remainder consisting of sum (Ws[j]) and carry (Wc[j]) to selector 116 and to multiplexers 108 and 118. During the next iteration (j+1), multiplexer 104 provides the divisor D and multiplexers 108 and 118 provide the sum (Ws[j]) and carry (Wc[j]) portions of the partial remainder from the prior iteration (j) to adder 120. Multiplexer 108 also supplies the dividend X to adder 120. Adder 120 generates the partial remainder (Ws[j+1] and Wc[j+1]) for iteration (j+1) and supplies these to registers 110 and 112 for use by adder 114 during the next (j+2) iteration.

Selector 116 receives the partial remainder (Ws[j] and Wc[j]) from adder 114 and selector 122 receives the partial remainder (Ws[j+1] and Wc[j+1]) from adder 120. Selector 116 generates an estimated quotient bit ($S_{j+1}$) for the next iteration (j+1) based on the four most significant bits of Wc and Ws generated by adder 114, and selector 122 generates an estimated quotient bit ($S_{j+2}$) for the following iteration (j+2), based on the four most significant bits of Wc and Ws generated by adder 120.

A Radix-R algorithm produces R−1 possible quotient bits 0, 1, . . . , R−1. Each iteration of the divide requires an exact calculation of the current remainder to determine the next quotient bit. The SRT introduces redundant quotient bits. For instance, in the case of a Radix-2 algorithm, the quotient bits may be −1, 0 and 1. With SRT, the remainder does not need to be known to an exact value for each iteration of the divide. Instead, the remainder need only be known within certain ranges. With a small enough error built into the remainder estimation, the quotient bits can be identified from the range which contains the partial remainder. For Radix-2, in order for the divide to remain bounded, the next partial remainder can not be more than the value of the divisor, nor can it be less than −1*divisor. Therefore, the absolute value of the next partial remainder must be no greater than the divisor: |W(j+1)|≦D.

Selectors 116 and 122 examine the four most significant bits Ws and Wc to perform the quotient estimation The following quotient selection logic will keep the partial remainder in bound:

If −2W[j] is the truncated version of 2W[j], where W[j]= Wc[j]+Ws[j],

| | |
|---|---|
| If 0 ≦ ~2W[j] ≦ 3, | then $S_{j+1}$ = 1 |
| If ~2W[j] = −1, | then $S_{j+1}$ = 0 |
| If −5 ≦ ~2W[j] ≦ −2, | then $S_{j+1}$ = −1 |

The four bits of −2W[j] for quotient estimation are the four integer bits, i.e. three integer bits and one fraction bit of −W[j], represented as Y3 Y2 YL.Y0

The quotient selection logic is based on the sum of the four most significant bits of Ws[j]+Wc[j]:

Magnitude of the quotient: Qm=!(P2&P1&P0)
Sign of the quotient:

| Qs = P3^(G2\|P2&G1\|P2&G1\|P2&P1&G0) | | |
|---|---|---|
| Carry propagation | Pi = Ci^Si | |
| Carry generation | Gi = Ci&Si | |
| Qm | Qs | $S_{j+1}$ |
| 0 | x | 0 |
| 1 | 0 | 1 |
| 1 | 1 | −1 |

Here, Ci and Si are the carry and sum part of each bit in −W[j].

Thus, the divide algorithm for dividend X, where $1 \leq X < 2$, and divisor D, where $1 \leq D < 2$, is:

Initially j=0, $S_0$=1, and W[0]=X−D,
1. Quotient estimation based on partial remainder W[j]:
   $S_{j+1}$=Qsel (W [j])
2. Calculate next partial remainder:

$W[j+1]=2*W[j]-S_{j+1}*D$

3. Iteratively repeat steps 1 and 2 until all the quotient bits are generated.

Consequently, if the truncated version −2W[j] is between 0 and 3, inclusive, S[j+1] is +1, if −2W[j] is −1, S[j+1] is 0, if −2W[j] is between −5 and −2, inclusive, S[j+1] is −1. Selectors 116 and 122 provide the estimated quotient bit to registers 128 and 130, which in turn provide outputs to multiplexers 102, 124, 126 and 132.

Shift register 128 accumulates a record (QP) of the number of times a positive divisor was subtracted from the current partial remainder, and register 130 accumulates a record (QN) of the number of times a negative divisor was subtracted from the current partial remainder. Each quotient bit S[j] enters a value into registers 128 and 130 as follows, where $\overline{QN}$ is the one's complement of QN:

TABLE 1

Quotient bit representation

| Quotient Value | QP | QN | $\overline{QN}$ |
|---|---|---|---|
| 1 | 1 | 0 | 1 |
| 0 | 0 | 0 | 1 |
| −1 | 0 | 1 | 0 |

Multiplexer 132 provides an output from registers 128 and 130 to shift circuit 134, which in turn provides an output to multiplexer 104. Multiplexers 124 and 126 provide outputs to result adder 24 (FIG. 1). As will become more evident herein, multiplexer 132 and shift circuit 134 are not used in the divide mode, and quotient bit selector 116 is not used in the square-root mode.

The quotient bit $S_{j+2}$ (or, for iteration j, $S_j$) selected by selector 122 is accumulated in registers 128 and 130 and is supplied to multiplexer 102 to generate the $-S_j*D$ part of the recurrence divide equation. The result is added by adder 114 to the stored sum and carry of the partial remainder for the prior iteration (j−1) to calculate $W[j]=2*W[j-1]-S_j*D$. Thus, adder 114 adds $2*W[j-1]$ to $-S_j*D$ to produce the partial remainder W[j] in the form of sum and carry for the current iteration. Selector 116 supplies the estimated quotient bit $S_{j+1}$ to registers 128 and 130 for the next (j+1) iteration. Adder 114 also supplies the sum and carry portions of the partial remainder of the j iteration to adder 120 for the j+1 iteration.

Adder 120 generates the partial remainder for the next iteration, which is transferred to registers 110 and 112 for use by adder 114 during the next (j+2) iteration. The four most significant digits of the partial remainder from adder 120 are used by selector 122 to provide an estimated quotient bit ($S_{j+2}$) for the j+2 iteration.

During the first iteration of the divide process (j=0), registers 110, 112, 128 and 130 are empty, so $W_0$ is zero. Consequently, $S_1$ selected by selector 116 is 1. During the second iteration, (j=1) adder 120 receives zero-valued, $Ws_0$ and $Ws_1$ and generates a partial remainder of −D. The quotient bit $S_2$ is selected by selector 122, and the partial remainder and accumulated quotient bits $S_0$ and $S_1$ are transferred by multiplexers 124 and 126 to result adder 24 (FIG. 1). Similarly, during the third and fourth iteration another partial remainder and quotient bits $S_2$ and $S_3$ are generated and transferred to the result adder. Registers 128 and 130 accumulate a record of the number of times a positive divisor was subtracted from a current partial remainder (QP) and the number of times a negative divisor was subtracted from a current partial remainder (QN).

At the end of the divide operation, multiplexers 124 and 126 are operated first to transfer the accumulated partial remainder from adder 120 to the result adder 24 (FIG. 1) and then to transfer the accumulated quotient components of QP and QN from registers 128 and 130 to result adder 24. Result adder 24 generates the value of the remainder and checks for the sign and zero value. A second partial remainder is generated by computing W[1]+D, where W[1] is the partial remainder after the last iteration 1. The sticky bit is set based on the sign and the value of the two remainders. The sticky bit is an indicator of floating point precision.

The final quotient is calculated in result adder 24 by subtracting QN from QP and adding a possible carry-in value. Since QN is stored in register 130 in 1's complement form as $\overline{QN}$, it can be added to QP. Hence, the quotient is calculated as QP+$\overline{QN}$+carry-in. The carry-in is 1 if the first remainder of the divide is 0 or positive. Otherwise, the quotient must be corrected one smaller by using a carry-in of 0. For IEEE 754 floating point values, single precision result is 26 bits (24 bits of fraction plus a guard and round bit) with the remainder determining the sticky bit. The double precision result is 55 its (53 bits of fraction plus a guard and round bit) with the remainder determining the sticky bit.

The square root algorithm is similar to the divide algorithm using the same quotient select logic but with a different partial remainder calculation. The requirement for the quotient select is also to guaranty the partial remainder is bounded. The operand range is [0.5, 2], so that if the exponent of the floating point number is an odd number the mantissa may be right-shifted one bit to change the exponent to an even number.

The square root algorithm for a number X, where $0.5 \leq X < 2$ is

Initially j=0, $S_0$=1, and W[0]=X−1
1. Quotient estimation based on W[j]:

$S_{j+1}=Qsel\ (W[j])$

2. Calculate next partial remainder W[j+1]:

$$S[j] = \sum_{i=0}^{j} S_1 \cdot 2^{-i}$$

$$W[j+1]=2W[j]-2S[j]S_{j+1}-S_{j+1}^2 \cdot 2^{-(j+1)}$$

3. Iteratively repeat steps 1 and 2 until all quotient bits are generated, where W[j] is the partial remainder at step j, $S_{j+1}$ is the estimated result for step j+1, w[j+1] is the partial remainder at step j+1 and S[j] is the accumulated result to step j.

Both the partial remainder and result are accumulated in a redundant number format as described above. Consequently, the partial remainder calculation of the square root requires two carry-save adders 114 and 120.

Referring to FIG. 2, the partial remainder is generated in selector 122 in redundant form, W[j]=Wc[j]+Ws[j]. Shift registers 128 and 130 will store the generated result bits S[j] to the j-th iteration, S[j]=QP−QN=QP+$\overline{QN}$. Substituting this value of S[j] into the square root remainder equation, W[j+1]=2W[j]−2S[j]$S_{j+1}$−$S_{j+1}^2 \cdot 2^{-(j+1)}$, when $S_{j+1}$ is 0, W[j+1]=2Wc[j]+2Ws[j], where Wc[j] and Ws[j] are the carry and sum parts of the partial remainder in the j-th iteration. In this case, adders 114 and 120 are only adding a zero to the partial remainder.

When $S_{j+1}$ is 1, −2S[j]$S_{j+1}$ is 2QN[j], and $S_{j+1}^2 \cdot 2^{-(j+1)}$ is −[2QP[j]]+$2^{-(j+1)}$, so $$W[j+1]=2Wc[j]+2Ws[j]+2QN[j]-[2QP[j]+2^{-(j+1)}].$$

In this case, multiplexer 102 supplies 2QN[j] to adder 114, which in turns adds 2Wc[j]+2Ws[j]+2QN[j], producing the result in the sum and carry format. −[2QP[j]+$2^{-(j+1)}$] is computed by shifter 134 and is supplied to adder 120 by multiplexer 104. Adder 120 adds −[2QP[j]+$2^{-(j+1)}$] to the result from adder 114 to derive W[j+1].

When $S_{j+1}$ is −1, −2S[j]$S_{j+1}$ is 2PN[j], and $S_{j+1}^2 \cdot 2^{-(j+1)}$], so $$W[j+1]=2Wc[j]+2Ws[j]+2QP[j]-[2QN[j]+2^{-(j+1)}]$$

In this case, multiplexer 102 supplies 2QPtj to adder 114, which in turns adds 2Wc[j]+2Ws[j]+2QP[j], producing the result in the sum and carry format. −[2QN[j]+$2^{-(j+1)}$] is computed by shifter 134 and is supplied to adder 120 by multiplexer 104. Adder 120 adds −[2QN[j]+$2^{-(j+1)}$] to the result from adder 114 to derive W[j+1].

Shifter circuit 134 shifts the input '1' one bit to the left and forces the −(j+1) bit position to binary '−1'. The one bit shift effectively provides −2QP[j] where $S_{j+1}$ is '1' or −2QN[j] where $S_{j+1}$ is '−1'. The force of a '1' at the −(j+1) bit position effectively adds $-2^{-(j+1)}$ to the shifted result. For example, if the output from multiplexer 132 (representing QP or QN) is a ten-bit bus, and the result S[j] to the fifth iteration is '0101000000', at the fifth iteration (j=5) shifter 134 shifts the partial remainder left by one-bit to '1010000000', and forces a '1' at the −6 bit position −(j+1), resulting in the mantissa of the partial remainder of '1010010000'. The result is summed with Ws[j] and Wc[j] by adder 120 to derive Ws[j+1] and Wc[j+1] which are stored in registers 110 and 112 for use as Ws[j] and Wc[j], respectively, during the next iteration.

Selector 122 selects the estimated result $S_{j+1}$, which is inserted into registers 128 and 130 as QP and $\overline{QN}$ for the next iteration. The result of selector 116 is not used for square root function. Since both adders 114 and 120 are used to compute one iteration of square root, only one result bit is generated each cycle through the circuit. The result bit is estimated using the same logic as described in the divider section. The result is maintained in identical fashion and shifted into shift registers 128 and 130, one bit at a time.

After all the iterations are completed, multiplexers 124 and 126 are operated first to transfer the accumulated partial remainder from adder 120 to the result adder 24 (FIG. 1) and then to transfer the accumulated values of QP and QN from registers 128 and 130 to result adder 24. The result adder generates the value of the remainder and checks for the sign and zero value. A second partial remainder is generated by computing W[1]+(2)S−$2^{-(j+1)}$, where S is the accumulated result to the last iteration and W[1] is the partial remainder after the last iteration 1. The sticky bit is set based on the sign and the value of the two remainders.

The accumulated result components are transferred after transfer of the accumulated partial remainder. The final result is calculated in result adder 24 by subtracting QN from QP as: QP+$\overline{QN}$+carry-in. The carry-in is 1 if the first remainder of the divide is 0 or positive. Otherwise, the result must be corrected one smaller by using a carry-in of 0.

For IEEE 754 floating point values, single precision result is 26 bits (24 bits of fraction plus a guard and round bit) with the remainder determining the sticky bit. The double precision result is 55 bits (53 bits of fraction plus a guard and round bit) with the remainder determining the sticky bit.

In the case of the first iteration if the initial partial remainder W[0] is equal to X−1 where X is the operand, the initial partial remainder W[0] is calculated by adder 120 while adder 114 is bypassed.

The mantissa calculator 22 (FIG. 2) calculates the mantissa to transfer the partial remainder from adder 120. The accumulated quotient or result bits are then transferred from registers 128 and 130. The result bits are accumulated for operation on adder 120, and the partial remainder is transferred to result adder 24. The partial remainder is employed by result adder 24 to generate the resulting mantissa and establish the final value of the exponent in accordance with traditional divide and square root algorithms.

The present invention thus provides an improved floating point divide and square root processor in which the square root algorithm is mapped to the divide algorithm hardware over plural divide operations. Hence, during each cycle, the processor provides plural quotient bits in the divide mode and a single result bit in the square root mode. The divide and square root algorithms share a common result prediction logic. The final corrective step in the square root result is performed based on the partial remainder.

The processor is small in size for reasonable performance and may be used for high frequency operation. While the invention is described herein as employing a Radix-2 algorithm, high performance may be achieved by duplicating the hardware or employing a higher radix algorithm. Nevertheless, use of Radix-2 algorithm permits simpler testing of the divide and square root processor, compared to multiplication-based and Radix-4-based processors.

Although the present invention has been described with reference to preferred embodiments, workers skilled in the art will recognize that changes may be made in form and detail without departing from the spirit and scope of the invention.

What is claimed is:

1. An iterative mantissa calculator for a floating point divide and square root processor that selectively calculates a divide result mantissa based on a divisor mantissa and dividend mantissa or a square-root result mantissa based on an operand mantissa, the calculator comprising:
- a plurality of summing devices, each of the summing devices being arranged to generate a partial remainder during a divide operation and at least one of the summing devices being arranged to generate a partial remainder during a square-root operation;
- a selector coupled to each summing device, each selector being arranged to select a quotient bit during a divide operation, and at least one of the selectors being arranged to select a result bit during a square-root operation;

a first of the summing devices being responsive during a first iteration to a partial remainder generated during a prior iteration and to an accumulated quotient generated by a second selector to generate a first partial remainder for a divide operation, a first selector being responsive to the first partial remainder to generate a quotient bit and accumulate a first quotient, a second of the summing devices being responsive during a second iteration to the first partial remainder generated during a prior iteration and to the accumulated first quotient to generate a second partial remainder for a divide operation and the second selector being responsive to the second partial remainder and the accumulated first quotient to accumulate a second quotient, and the first of the summing devices being responsive to a partial remainder generated by the second summing device during a prior iteration and to an result accumulated during the prior iteration to generate a sum, the second of the summing devices being responsive to the sum and to a shifted accumulated result to generate a partial remainder and the second selector being responsive to the partial remainder to generate a result bit and accumulate a result; and

- a result adder responsive to the partial remainder and the accumulated quotient or result to generate a quotient mantissa or square-root result mantissa.

2. The mantissa calculator of claim 1, further including:
an output responsive to one of the summing devices for outputting the partial remainder generated by the one summing device and the accumulated quotient or result.

3. The mantissa calculator of claim 1, wherein there are two summing devices, and during each iteration in the divide mode the respective first and second summing devices each calculates a respective partial remainder, W[j+1], for use by the other of the first and second summing devices during the next iteration, represented by $2*W[j]-S_{j+1}*D$, where w[j] is the partial remainder generated by one summing device during the current iteration, $S_{j+1}$ is a result bit based on the partial remainder generated by the other summing device during a prior iteration and D is a divisor bit, and wherein the partial remainder, W(0), for an initial iteration is equal to X–D, where X is the respective dividend bit.

4. The mantissa calculator of claim 3, further including:
an output responsive to the second summing device for outputting the partial remainder generated by the second summing device and the accumulated quotient.

5. The mantissa calculator of claim 3, wherein during the square root mode, the first summing device calculates a sum representative of $2W[j]-2S[j]S_{j+1}$, and the second summing device calculates a partial remainder W[j+1] based on the sum and $S_{j+1}^2 \cdot 2^{-(j+1)}$, where W[j] is the partial remainder calculated during a prior iteration, S[j] is the accumulated result bits to the current iteration, and $S_{j+1}$ is the result bit based on a partial remainder calculated by the second summing device during the prior iteration.

6. The mantissa calculator of claim 5, further including:
an output responsive to the second summing device for outputting the partial remainder generated by the second summing device and the accumulated result.

7. The mantissa calculator of claim 5, including a shifter responsive to plural result bits based on the partial remainder of the second summing device for calculating $S_{j+1}^2 \cdot 2^{-(j+1)}$.

8. The mantissa calculator of claim 1, wherein during the square root mode, the first summing device calculates a sum representative of $2W[j]-2S[j]S_{j+1}$, and the second summing device calculates a partial remainder W[j+1] based on the sum and $S_{j+1}^2 \cdot 2^{-(j+1)}$, where W[j] is the partial remainder calculated during a prior iteration, S[j] is the accumulated result bits to the current iteration, and $S_{j+1}$ is the result bit based on a partial remainder calculated by the second summing device during the prior iteration.

9. The mantissa calculator of claim 8, including a shifter responsive to plural result bits based on the partial remainder of the second summing device for calculating $S_{j+1}^2 \cdot 2^{-(j+1)}$.

10. A computer processor for calculating a floating point quotient based on a divisor mantissa, a dividend mantissa, a divisor exponent and a dividend exponent, and for calculating a square root result based on an operand mantissa and an operand exponent, the processor comprising:
- an iterative mantissa calculator that selectively calculates a divide result mantissa or a square-root result mantissa, the calculator having:
- a plurality of summing devices, each of the summing devices being arranged to generate a partial remainder during a divide operation and at least one of the summing devices being arranged to generate a partial remainder during a square-root operation;
- a selector coupled to each summing device, each selector being arranged to select a quotient bit during a divide operation, and at least one of the selectors being arranged to select a quotient bit during a divide operation, and at least one of the selectors being arranged to select a result bit during a square-root operation;
- a first of the summing devices being responsive during a first iteration to a partial remainder generated during a prior iteration and to an accumulated quotient generated by a second selector to generate a first partial remainder for a divide operation, a first selector being responsive to the first partial remainder to generate a quotient bit and accumulate a first quotient, a second of the summing devices being responsive during a second iteration to the first partial remainder generated during a prior iteration and to the accumulated first quotient to generate a second partial remainder for a divide operation and the second selector being responsive to the second partial remainder and the accumulated first quotient to accumulate a second quotient, and
- the first of the summing devices being responsive to a partial remainder generated by the second summing device during a prior iteration and to an result accumulated during the prior iteration to generate a sum, the second of the summing devices being responsive to the sum and to a shifted accumulated result to generate partial remainder and the second selector being responsive to the partial remainder to generate a result bit and accumulate a result; and
- a result adder responsive to the partial remainder and accumulated quotient or result to generate a quotient mantissa or square-root result mantissa; and
- an exponent calculator responsive to the divisor and dividend exponents to calculate a divide exponent and being responsive to the operand exponent to calculate the square-root exponent.

11. The processor of claim 10, wherein there are two summing devices, and during each iteration in the divide mode the respective first and second summing devices each calculates a respective partial remainder, W[j+1], for use by the other of the first and second summing devices during the next iteration, represented by $2*W[j]-S_{j+1}*D$, where W[j] is the partial remainder generated by one summing device during the current iteration $S_{j+1}$ is a result bit based on the partial remainder generated by the other summing device during a prior iteration and D is a respective divisor bit, and wherein the partial remainder, W(0), for an initial iteration is equal to X−D, where X is the respective dividend bit.

12. The processor of claim 11, further including:
an output responsive to the second summing device for outputting the partial remainder generated by the second summing device and the accumulated quotient.

13. The processor of claim 11, wherein during the square root mode, the first summing device calculates a sum representative of $2W[j]-2S[j]S_{j+1}$, and during a second iteration of the square root mode, the second summing device calculates a second partial remainder W[j+1] based on the first partial remainder and $S_{j+1}^2 \cdot 2^{-(j+1)}$, where W[j] is the partial remainder calculated during a prior iteration, S[j] is the accumulated result bits to the current iteration, and $S_{j+1}$ is the result bit based on a partial remainder calculated by the second summing device during the prior iteration.

14. The processor of claim 13, further including:
a output responsive to the second summing device for outputting the partial remainder generated by the second summing device and the accumulated result.

15. The processor of claim 13, including a shifter responsive to plural result bits based on the partial remainder of the second summing device for calculating $S_{j+1}^2 \cdot 2^{-(j+1)}$.

16. A computer process of selectively performing a floating point divide or square root operation, including steps of:
a) providing an iterative mantissa calculator for operating in a divide mode and in a square root mode, the calculator having at least first and second summing devices;
b) operating the calculator in the divide mode, including steps of:
b1) operating the first summing device during a first iteration to generate a first divide partial remainder, W[j+1], as $2*W[j]-S_{j+1}*D$, where W[j] is a divide partial remainder generated by the second summing device during a prior iteration, $S_{j+1}$ is a quotient bit generated during the prior iteration, and D is a divisor,
b2) selecting a first quotient bit based on the first divide partial remainder,
b3) generating a first quotient based on the accumulated quotient generated during the prior iteration and the first quotient bit,
b4) operating the second summing device during a second iteration to generate a second divide partial remainder, W[j+2], as $2*W[j+1]-S_{j+2}*D$, where W[j+1] is the first divide partial remainder and $S_{j+2}$ is a quotient bit generated during the first iteration,
b5) selecting a second quotient bit based on the second divide partial remainder, and
b6) generating a second quotient based on the accumulated first quotient and the second quotient bit; and c) operating the calculator in the square root mode, including steps of:
c1) operating the first summing device to generate a sum representative of $2W[j]-2S[j]S_{j+1}$, where W[j] is a square-root partial remainder generated by the second summing device during a prior iteration, S[j] is an accumulated result generated during a prior iteration and $S_{j+1}$ is a second quotient bit or result bit generated by the second summing device during a prior iteration, and
c2) operating the second summing device during a second iteration to generate a square-root partial remainder, W[j+1], represented by $2W[j]-2S[j]S_{j+1}-S_{j+1}^2 \cdot 2^{-(j+1)}$,
c3) selecting a result bit based on the square-root partial remainder, and
c4) generating a result based on the accumulated result and the result bit.

17. The process of claim 16, wherein step (b) further includes steps of:
b5) output the second divide partial remainder, and
b6) output the accumulated quotient, and step (c) further includes:
c4) output the second square-root partial remainder, and
c5) output the accumulated result.

* * * * *